United States Patent [19]

Sui

[11] Patent Number: 4,977,465
[45] Date of Patent: Dec. 11, 1990

[54] TAPE RECORDER WITH DECELERATION CONTROL FOR CAPSTAN MOTOR DURING CONNECTION RECORDING

[75] Inventor: Masahiro Sui, Saitama, Japan

[73] Assignee: Pioneer Electronic Corporation, Tokyo, Japan

[21] Appl. No.: 738,806

[22] Filed: May 29, 1985

[30] Foreign Application Priority Data

May 29, 1984 [JP] Japan ................................ 59-109079
May 29, 1984 [JP] Japan ................................ 59-109081

[51] Int. Cl.$^5$ ............................................. H04N 5/78
[52] U.S. Cl. ................................................... 360/33.1
[58] Field of Search ................. 360/33.1, 70, 93, 14.2, 360/64

[56] References Cited

U.S. PATENT DOCUMENTS

| | | | |
|---|---|---|---|
| 3,874,606 | 4/1975 | Camoas et al. ................. | 360/93 X |
| 3,934,269 | 1/1976 | Fujita et al. .................... | 360/70 |
| 4,297,733 | 10/1981 | Sanderson . | |
| 4,358,797 | 11/1982 | Nishijima et al. . | |
| 4,396,954 | 8/1983 | Sonoda et al. ................. | 360/64 X |
| 4,463,391 | 7/1984 | Takano et al. ................. | 360/142 |

FOREIGN PATENT DOCUMENTS

| | | | |
|---|---|---|---|
| 066776 | 12/1982 | Japan ............................... | 358/906 |
| 2056153 | 3/1981 | United Kingdom ............. | 360/10.3 |

OTHER PUBLICATIONS

"Microprocessor Controlled Variable Play–Back Speed Systems for Video Tape Recorder", Azuma et al: IEEE Transactions on Consumer Electronics, vol. CE-261, No. 1; Feb. 1980, pp. 121-128.
Servicing Home Video Cassette Recorders; Hobbs; ©1982, Hayden Book Co, Inc., pp. 216-218.
National Technical Report, Ikeda et al., vol. 28, No. 3, Jun. 1982.

Primary Examiner—Aristotelis M. Psitos
Attorney, Agent, or Firm—Sughrue, Mion, Zinn, Macpeak & Seas

[57] ABSTRACT

A recording/reproducing apparatus, specifically, a video tape recorder, in which time losses in performing connection recording due to transitions through a winding and/or reproducing mode when changing from the recording pause mode or the like to the recording mode are substantially eliminated. A capstan motor is employed with which the time required for the speed of the tape driven by the motor to reach zero from the normal operating speed is smaller than a period corresponding to a single frame of the recording video signal. The timing of the start of deceleration of the capstan motor is controlled such that a level transition of a changeover signal for the recording head occurs in a period of deceleration of the capstan motor when the operating mode is changed from the recording mode to the recording pause mode. The recording current supplied to the recording head is cut off at the same time as the level transition of the recording head changeover signal.

3 Claims, 2 Drawing Sheets

TAPE RECORDER WITH DECELERATION CONTROL FOR CAPSTAN MOTOR DURING CONNECTION RECORDING

BACKGROUND OF THE INVENTION

The present invention relates to a recording/reproducing apparatus, and particularly to a magnetic tape recording/reproducing apparatus of the helical scanning type.

A recording/reproducing apparatus of the same general type to which the invention pertains is usually a VTR (Video Tape Recorder). In a VTR, it is possible to perform so-called "connection" recording operations such as insertion, editing, etc. (Connection recording is also known as smooth cut over recording.) These operations start from a recording mode, go to a recording pause mode, and return to the recording mode. In the conventional apparatus, the magnetic tape is rewound to some extent in response to a recording pause command, and when the operation is again shifted to the recording mode, the operation is started after a capstan servo is actuated while a CTL (control tracking) signal is being reproduced. (Such a CTL System is described in U.S. Pat. No. 4,358,797, for example.)

With this method, there are unavoidable problems, including the facts that a time loss occurs because the tape is rewound and the capstan servo is actuated, and shifting occurs at editing points.

On the other hand, recently there has been proposed a so-called 8 mm VTR employing 8 mm tape. In such an 8 mm VTR, rather than a CTL system, a so-called four-frequency pilot tracking system is employed. When connection recording is performed with this four-frequency pilot tracking system, it is necessary to cause the operation to shift to the recording mode after the tracking servo is actuated while the signal system is still in the reproducing mode. Accordingly, there is a disadvantage that there occurs a time loss upon the changeover of the signal system until a stable state is reached. (Such a four-frequency pilot tracking system is described in U.S. Pat. No. 4,297,733, for example.)

The same problems as those described above occur not only in the transient time from the recording pause mode to the recording mode, but also when the operation shifts from the still reproducing mode or the slow reproducing mode to the recording mode.

SUMMARY OF THE INVENTION

An object of the present invention is to provide a recording/reproducing apparatus in which connection recording can be accurately performed through steps of tape rewinding and reproducing when the operation is changed from the recording mode to the recording pause mode or from the recording pause mode to the recording mode.

Another object of the present invention is to provide a recording/reproducing apparatus in which connection recording can be accurately performed when the operation is changed from a mode in which the drum of the recording head is rotating while the capstan motor is stopped.

In accordance with the above and other objects, a recording/reproducing apparatus according to one aspect of the present invention comprises: a capstan motor for which the time required for the speed of a recording tape driven by the capstan motor to reach zero from a rated value is smaller than a period corresponding substantially to one frame of a recording video signal; means for controlling the timing of the start of deceleration of the capstan motor such that a level transition of a changeover signal for a recording head occurs in a period of deceleration of the capstan motor when an operating mode is changed from a recording mode to a recording pause mode; and means for cutting off a recording current supplied to the recording head at the same time as the level transition of the recording head changeover signal.

A recording/reproducing apparatus according to another aspect of the present invention is featured in that the apparatus comprises, in addition to the components in the apparatus described above, means for controlling the timing of the start of acceleration of the capstan motor such that a level transition of the recording head changeover signal in the predetermined direction occurs in a period of acceleration of the capstan motor when the operating mode is changed from the recording pause mode to the recording mode; and means for starting supply of a recording current to the recording head at the same time as the above-mentioned level transition of the recording head changeover signal.

A recording/reproducing apparatus according to still another aspect of the present invention is featured in that the apparatus comprises: a capstan motor for which the time required for the speed of a recording tape to reach a rated value from zero is smaller than a period corresponding substantially to one frame of a recording video signal; means for controlling the timing of the start of acceleration of the capstan motor such that a level transition of the recording head changeover signal occurs in a period of acceleration of the capstan motor when the operating mode is changed to a recording mode from a mode in which a drum of a recording head is rotating but the capstan motor is stopped; and means for starting supply of recording current to the recording head at the same time as the second-mentioned level transition of the recording head changeover signal.

DESCRIPTION OF THE PREFERRED EMBODIMENTS

Figure 1:
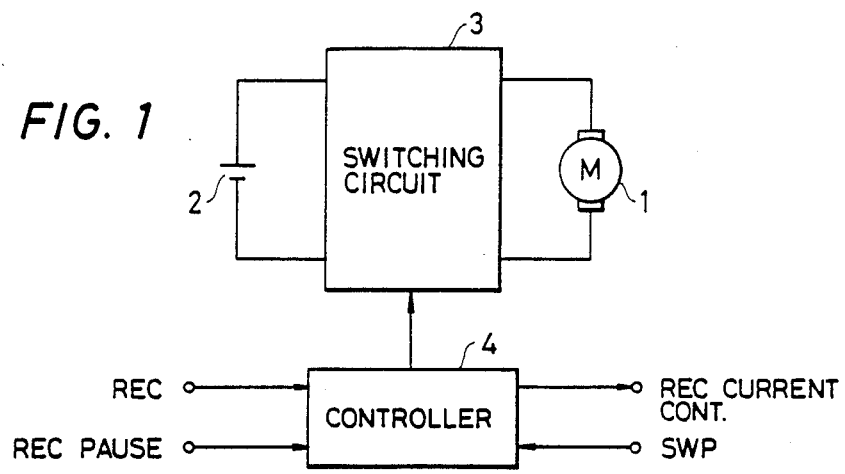
FIG. 1 is a block diagram of a recording/reproducing apparatus of the present invention.

Referring to the drawings, preferred embodiments of the present invention will be described hereunder.

FIG. 1 is a schematic block diagram showing a recording/reproducing apparatus of the present invention. The rotation of a capstan motor 1 is controlled by controlling current flow from a drive electric source 2, the current control being performed by a current switching circuit 3. The switching operation of this current switching circuit 3 is performed in response to an output of a controller 4, implemented with a microprocessor or the like. The controller 4 receives a recording (REC) command signal, a recording pause (REC PAUSE) command signal from a keyboard (not shown), and a head changeover signal (which is a switching signal and represented by SWP) derived from a phase signal of a head drum (not shown) or the like, and generates, in accordance with a predetermined procedure, a switching operation command for the current switching circuit 3 and an on/off control command for controlling the head recording current.

Figure 2:
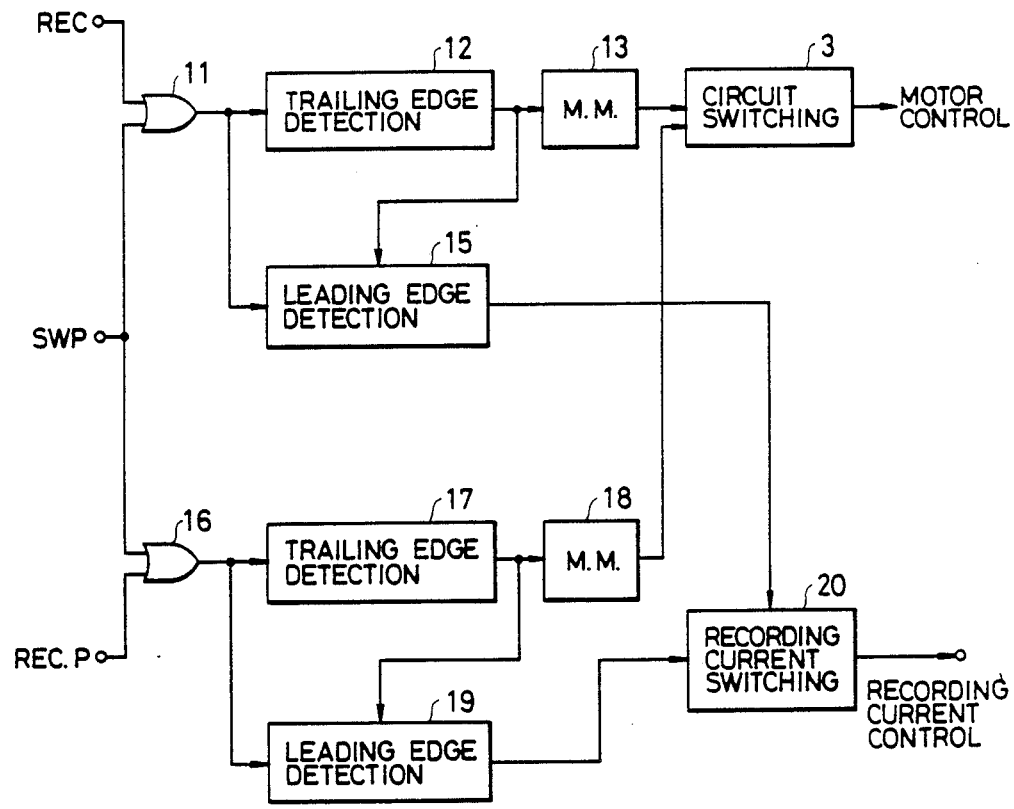
FIG. 2 is a block diagram of a controller used in the apparatus of FIG. 2.

FIG. 2 is a block diagram showing an example of the circuit arrangement of the controller 4. When the recording mode is changed to the recording pause mode, the REC PAUSE signal is turned on and the SWP signal is output from an AND gate 16. The SWP signal is applied to a trailing edge detection circuit 17 which detects the trailing edge of the SWP signal (at t=0 in FIG. 3) to trigger a monostable multivibrator 18. After a time $t_N$ (FIG. 3) elapses, the capstan motor is decelerated by the motor current switching circuit 3. The tape stops after the lapse of $t_S$. At the same time, the SWP signal from the AND gate 16 is also applied to the leading edge detection circuit 19. The leading edge detection circuit 19 detects the leading edge of the SWP signal following the signal detected by the trailing edge detection circuit 17, and outputs a recording current supplying stop signal to a recording current switching circuit 20 to thereby turn the recording current off.

When the recording pause mode is changed to the recording mode, the REC signal is turned on and the SWP signal is outputted from the AND gate 11. The SWP signal is applied to the trailing edge detection circuit 12, which detects the trailing edge of the SWP signal immediately after the time $t_3$ in FIG. 3 to trigger a monostable multivibrator 13. After a lapse of time of $2\tau - (t_N + t_S)$, where $\tau$ is equal to a field period, the capstan motor is accelerated by the motor current switching circuit 3 until the speed of the tape reaches $V_O$. At the same time, the SWP signal from the AND gate 11 is also applied to the leading edge detection circuit 15. The leading edge detection circuit detects the leading edge of the SWP signal following the signal detected by the trailing edge detection circuit 12, and outputs the recording current supplying start signal to the recording current switching circuit 20 to thereby turn the recording current on.

In this example, although trailing edge detection circuits 12 and 17 and leading edge detection circuits 15 and 19 are used, the circuits 12 and 17 can be made leading edge detection circuits and the circuits 15 and 19 trailing edge detection circuits.

Figure 3:
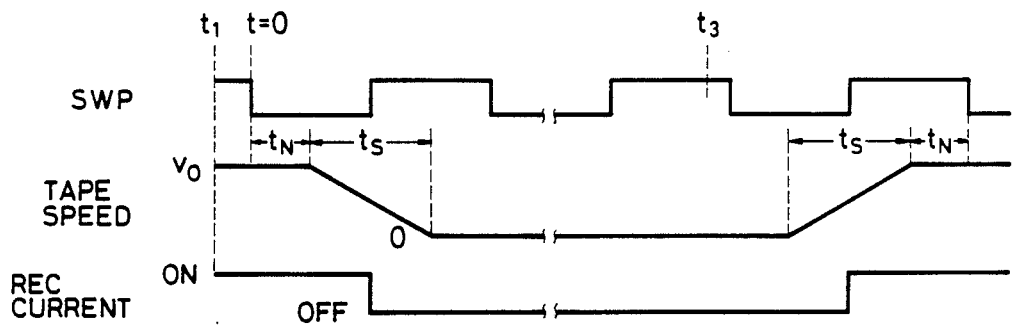
FIG. 3 is a timing chart used for explaining the operation of the embodiment of FIG. 1.

A timing chart for explaining the operation of the device of FIG. 1 is shown in FIG. 3, which shows the relationships among the tape speed, the phase of the SWP signal, and the on/off timing of the recording current under the condition that a recording pause command is applied at the time $t_1$ in the recording mode and a recording command is applied at the time $t_3$ in the recording pause mode.

In order to minimize unwanted bending of the recording track at the editing position during connection recording, it is necessary to control the capstan motor such that the characteristic curve of deceleration of the capstan motor (and thus the recording tape) between the rated speed and zero and the characteristic curve of acceleration are symmetrical. Further, in order to prevent a guard band (a gap between tracks) from occurring at the editing positions, it is necessary to make the tape feeding quantity no more than an amount corresponding to a single track pitch during the period including the acceleration/deceleration period and the constant speed running period of the recording tape.

Moreover, in order to prevent the recording track from becoming too narrow in width at the editing points, it is necessary to make the tape feeding quantity be an amount equal to a least one track pitch during periods including the acceleration/deceleration period and the constant speed period.

It is assumed, for simplicity, that the starting, acceleration/deceleration, and stopping of the capstan are performed at constant accelerating/decelerating speeds which are equal to each other in absolute value, the time required for acceleration/deceleration is represented by $t_S$, and the period including the constant speed period and the acceleration/deceleration periods required for obtaining the tape feeding quantity of one track pitch is represented by $t_N$. Further, the rated tape speed in the normal running period is represented by $v_O$, the quantity of tape fed in the constant-speed period and the acceleration/deceleration periods is represented by L, and the time for one field (that is, one-half frame period) is represented by $\tau$.

When the tape feeding quantity in the period including the acceleration/deceleration periods and the constant speed period is selected to be one track pitch as described above, the following expression is satisfied:

$$L = v_0\tau = \int_0^{t_N} v_0 dt + \int_{t_N}^{t_N + t_S}\left(-\frac{v_0}{t_S}t + \frac{t_N + t_S}{t_S}v_0\right)dt \qquad (1)$$
$$= v_0 t_N + \tfrac{1}{2}v_0 t_S.$$

A reference point when t=0 is the time point of period level transition (the time point of transition from a high level to a low level in FIG. 2) of the SWP signal following the time point $t_1$ of a recording pause command. From expression (1), the following expression is obtained.

$$t_N = \tau - (\tfrac{1}{2})t_S. \qquad (2)$$

As can be seen from expression (2), it is necessary to use a capstan motor which can cause $t_S < 2\tau$ (one frame period) to be satisfied.

Further, when connection recording is performed, it is necessary to cut off the recording current supply to the head not before but during the deceleration period ($t_S$). If the recording current is cut off midway of a track, an RF (high-frequency) signal will also be cut off and the track will become discontinuous. Accordingly, it is necessary to cut off the recording current after one track has been recorded. Therefore, the recording current is controlled to be cut off at the level transition timing of the SWP signal after deceleration is started. Thus, the tape feeding quantity $L_{ON}$ prior to the recording current being cut off is expressed as follows:

$$L_{ON} = \int_0^{t_N} v_0 dt + \int_{t_N}^{\tau} \left( -\frac{v_0}{t_S} t + \frac{t_N + t_S}{t_S} v_0 \right) dt \quad (3)$$

$$= \int_0^{\tau \frac{1}{2} t_S} v_0 dt +$$

$$\int_{\tau \frac{1}{2} t_S}^{\tau} \left( -\frac{v_0}{t_S} t + \frac{\tau + t_S/2}{t_S} v_0 \right) dt$$

$$= v_0(\tau - t_S/2) + (3/8)t_S v_0$$

$$= v_0(\tau - t_S/8)$$

It is necessary for $L_{ON} = L$ in order for the track to be completely continuous without being bent. This means that $t_S = 0$ (from expressions (1) and (3)), which is physically impossible, and thus some track bending will necessarily occur and cannot be avoided. In order to reduce the amount of track bending, it is of course necessary to make the period $t_S$ as short as possible. However, the lower limit of the period $t_S$ is several milliseconds. Assuming that, for example, $t_S = \tau$, a practical value of the tape feeding quantity $L_{ON}$ is given by the following expression (derived from expression (3)):

$$L_{ON} = v_0(\tau - \tau/8) = (7/8)v_0\tau \quad (4)$$
$$= (7/8)L$$

Thus, the operation is shifted to the recording pause mode after the track is bent by 12.5%. Such a state of track bending is shown by the track 5 indicated by a dotted line in FIG. 3.

Next, when the operation is changed over from the recording pause mode to the recording mode, opposite the foregoing operation, the head recording current is turned on at the time point of level transition from the low level to the high level of the SWP signal after acceleration has started. Control is then effected such that the recording current is supplied at this time to the head opposite to the one used for recording immediately before the operation is shifted to the recording pause mode. Thus, the field phase of a recording video signal has continuity before and after an editing position.

In the case of a so-called four-frequency tracking system, it is a matter of course that control is effected so as to maintain continuity of the pilot signal used for tracking. That is, assuming that four pilot frequencies $f_1$ to $f_4$ are recorded in every field, one by one, in the order of $f_1$, $f_2$, $f_3$, and $f_4$, if, for example, a pilot signal of the frequency $f_1$ has been recorded immediately before the operation was shifted to the recording pause mode, a pilot signal of the frequency $f_2$ will be recorded when the operation is shifted next into the recording mode from the recording pause mode. Thus, pilot signals of frequencies in the stated order are successively recorded.

Figure 4:
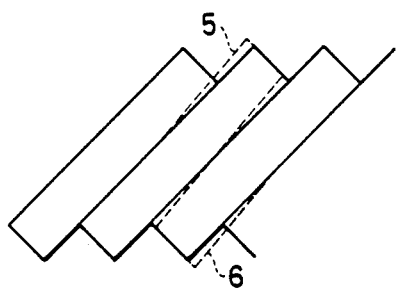
FIG. 4 is a diagram showing the state of recording tracks at an editing point.

In this case, when the operation is shifted to the recording pause mode from the recording mode, the track will be bent in the direction opposite to the previous mode, such as the track 6 indicated by a dotted line in FIG. 4. Also in this case, in order to eliminate the formation of guard bands, it is sufficient to widen the head width by 12.5% relative to the track pitch. For example, if the track pitch is 20 microns, if the head width is widened by 22.5 microns or more, no guard band is generated. In this case, the largest possible reduction in the RF signal level is about $20 \log (\frac{7}{8}) = -1.2$ dB, which is not significant.

The example described above is the case where $t_S = \tau$ (a period corresponding to one field—about 16.7 msec) and the respective values of the deceleration/acceleration start timing, the on/off timing of the recording current, and head width are known. As seen from this example, if the value of $t_S$ and the variations thereof are obtained from the characteristics of the capstan motor, the acceleration/deceleration timing and the head width can be calculated through the procedure described above. Accordingly, if the acceleration/deceleration timing and the on/off timing of the recording current are programmed in advance, it becomes possible to perform connection recording with no difficulties using only operations such as rewinding, reproducing, etc.

Even if worst conditions for $t_S$ are assumed, the reduction in the RF signal level is still only $20 \log (\frac{3}{4}) = -2.5$ dB, and if $D_W$ (head width) $= 1.25 T_p$ (track pitch) $= 25$ microns, no guard bands will be generated and connection recording with no difficulties can be performed.

The application of the present invention is not limited to the case of transition from the recording pause mode to the recording mode, and the invention can be similarly applied to the case where the operation is shifted to the recording mode from a mode in which the head drum is rotating for still or slow reproduction and the capstan is stopped.

According to the present invention, as described above, it is possible to change the operating mode from the recording pause mode or the like to the recording mode without going through the winding and/or reproducing mode, whereby time losses are completely eliminated and it becomes possible to perform good connection recording.

I claim:

1. A tape recording apparatus having a recording head and being changeable between recording and recording pause operating modes, comprising: capstan motor means for driving a recording tape and for which a time required for the speed of the recording tape driven by said capstan motor means to reach zero from a rated value is smaller than a period corresponding substantially to one frame of a recording video signal; means for providing a head changeover signal; means, coupled to said capstan motor means, for controlling a timing of start of deceleration of said capstan motor means such that level transition of said head changeover signal for the recording head occurs in a period of deceleration of said capstan motor means when an operating mode is changed from a recording mode to a recording pause mode; and means, responsive to said head changeover signal, for cutting off a recording current supplied to said recording head at the same time as said level transition of said recording head changeover signal.

2. A tape recording apparatus having a recording head and being changeable between recording and recording pause operating modes, comprising: capstan motor means for driving a recording tape and for which a time required for the speed of the recording tape driven by said capstan motor means to reach zero from a rated value is smaller than a period corresponding substantially to one frame of a recording video signal; means for providing a head changeover signal; means, coupled to said capstan motor means, for controlling a timing of start of deceleration of said capstan motor means such that level transition of said head changeover signal for the recording head in a predetermined direction occurs in a period of deceleration of said capstan motor means when an operating mode is changed from a recording mode to a recording pause mode; and means, responsive to said head changeover signal, for cutting off a recording current supplied to said recording head at a same time as said level transition of said recording head changeover signal; means, coupled to said capstan motor means, for controlling a timing of start of acceleration of said capstan motor means such that a level transition of said recording head changeover signal in said predetermined direction occurs in a period of acceleration of said capstan motor means when said operating mode is changed from said recording pause mode to said recording mode; and means, responsive to said head changeover signal, for starting supply of a recording current to said recording head at the same time as said second-mentioned level transition of said recording head changeover signal.

3. A tape recording apparatus having a recording head and being changeable between operating modes, comprising: capstan motor means for driving a recording tape and for which a time required for the speed of the recording tape driven by said capstan motor means to reach a rated value from zero is smaller than a period corresponding substantially to one frame of a recording video signal; means for providing a recording head changeover signal; means, coupled to said capstan motor means, for controlling a timing of start of acceleration of said capstan motor means such that a level transition of said recording head changeover signal occurs in a period of acceleration of said capstan motor means when an operating mode is changed to a recording mode from a mode in which a drum of the recording head is rotating and said capstan motor means is stopped; and means, responsive to said head changeover signal, for starting supply of a recording current to said recording head at the same time as said level transition of said recording head changeover signal.

* * * * *